(12) United States Patent
Geib et al.

(10) Patent No.: US 6,357,958 B1
(45) Date of Patent: Mar. 19, 2002

(54) UNIVERSALLY ADJUSTABLE MOUNTING DEVICE

(75) Inventors: Randall R. Geib, Manheim; Matthew P. Johnson, York, both of PA (US)

(73) Assignee: Fenner, Inc., Manheim, PA (US)

( * ) Notice: Subject to any disclaimer, the term of this patent is extended or adjusted under 35 U.S.C. 154(b) by 0 days.

(21) Appl. No.: 09/457,542

(22) Filed: Dec. 9, 1999

(51) Int. Cl.$^7$ ................................................ F16B 2/00
(52) U.S. Cl. ...................... 403/369; 403/379.6; 403/11; 403/193; 403/297
(58) Field of Search .............................. 403/193, 194, 403/195, 297, 314, 374.3, 374.4, 369, 371, 379.6

(56) References Cited

U.S. PATENT DOCUMENTS

| | | |
|---|---|---|
| 1,687,777 A | 10/1928 | McMurtrie |
| 4,202,644 A | 5/1980 | Soussloff |
| 4,345,851 A | 8/1982 | Soussloff |
| 4,367,053 A | 1/1983 | Stratienko |
| 4,543,704 A | 10/1985 | Soussloff |
| 4,600,334 A | 7/1986 | Soussloff |
| 4,615,640 A | 10/1986 | Hosokawa |
| 4,824,281 A | 4/1989 | Kzatsube |
| 5,009,539 A | 4/1991 | Mullenberg |
| 5,374,135 A | 12/1994 | Folsom |
| 5,474,403 A | 12/1995 | Hetrich |
| 5,695,297 A | 12/1997 | Hetrich |
| 6,261,185 B1 * | 7/2001 | Peterson et al. ............. 403/371 |

FOREIGN PATENT DOCUMENTS

EP          0 318 977 B1     9/1993

* cited by examiner

Primary Examiner—Lynne H. Browne
Assistant Examiner—Aaron M Dunwoody

(74) Attorney, Agent, or Firm—Dann, Dorfman, Herrell and Skillman; Stephen H. Eland

(57) ABSTRACT

A keyless mounting device has inner and outer tubular sleeves telescopically engaged. The confronting surfaces of the inner and outer sleeves are tapered so that relative axial displacement of the sleeve in one direction expands the outer surface of the outer sleeve and contracts the inner surface of the inner sleeve. Relative axial displacement in the other direction allows the outer surface to contract and the inner surface to expand. The inner and outer sleeves are threaded at one end and the free end of each sleeve adjacent the threads provides an annular abutment surface. An adjustor is provided to effect the relative axial displacement of the sleeves. The adjustor has one set of threads to engage the threads of the inner and an abutment surface to engage the abutment surface of the outer when the threads are tightened and second threads adapted to engage the threads of the outer and second abutment surface adapted to engage the abutment surface of the inner when loosening the sleeves. One form of the adjustor is a one-piece unit having a hexagonal form with threads at opposite ends so that the one-piece adjustor may be reversed and changed from loosening to tightening and vice versa. A second adjustor is shown having a knurled outer configuration to facilitate manual adjustment between tightening and loosening. A third adjustor is a two-piece adjustor having one piece adapted to perform the tightening operation and a second piece adapted to perform the loosening operation. In the illustrated embodiment of the two-piece adjustor, one of the pieces is provided with a cutout so that it may be removed from the shaft without need for sliding it off the end of the shaft.

8 Claims, 3 Drawing Sheets

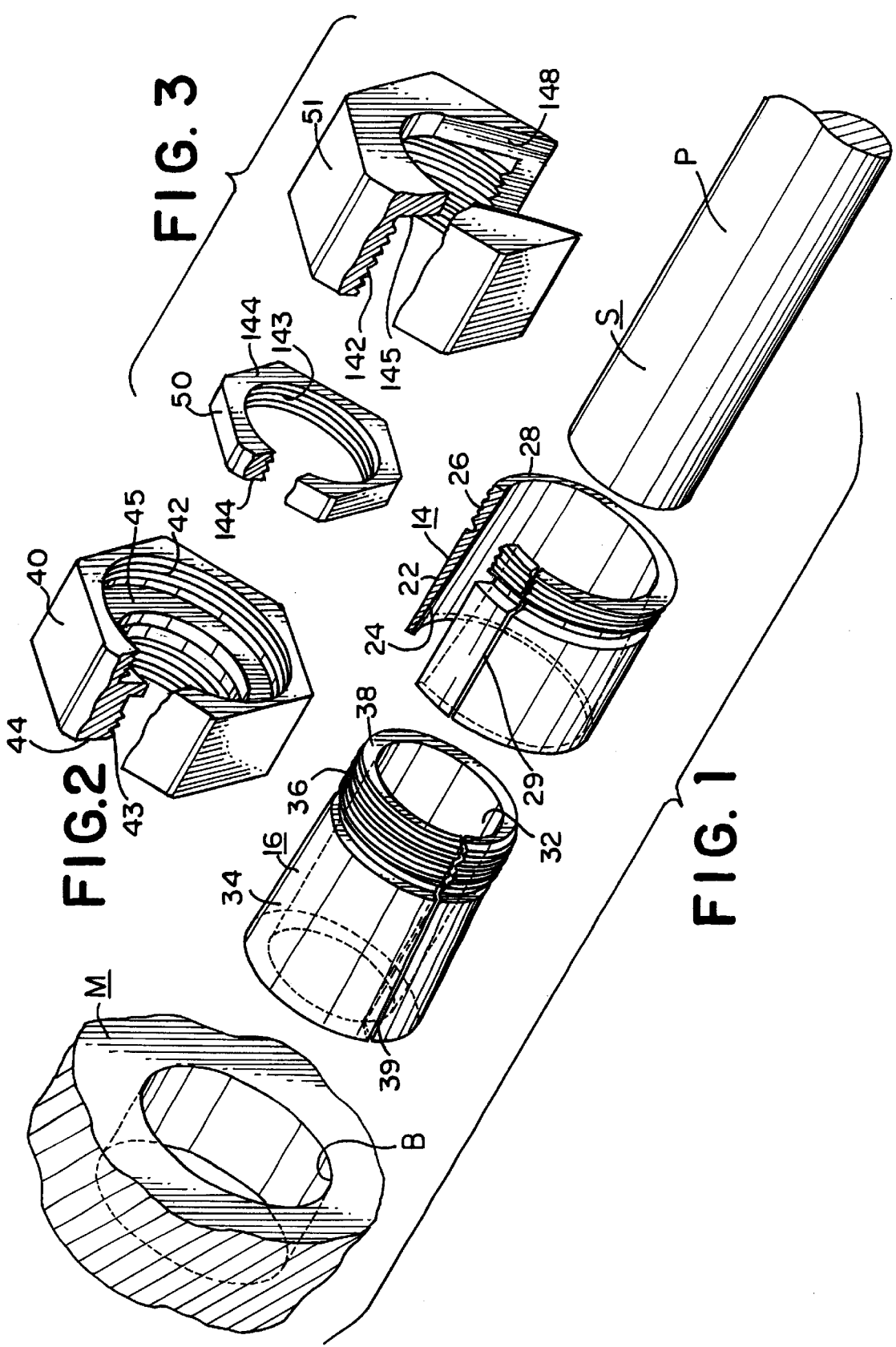

UNIVERSALLY ADJUSTABLE MOUNTING DEVICE

FIELD OF THE INVENTION

The present invention relates to a device for mounting or positioning a machine element upon a shaft element which avoids the use of a key and keyways to prevent relative circumferential displacement between the shaft element and the machine element and enables anchoring or positioning of the machine element on the shaft element with the use of an adjuster in the form of a nut to effect an interlock between the machine element and the shaft element.

BACKGROUND OF THE INVENTION

Keyless mounting devices have been used in recent years to permit the mounting of a machine element on a shaft with infinitely variable adjustment in both an axial and circumferential directions. Avoiding the use of a key to achieve the firm interlock between the machine element and the shaft element enables the adjustment to be infinitely variable. One such arrangement as shown in the prior U.S. patents to Soussloff Nos. 4,202,644 and 4,600,334 enables the anchoring of the machine element to be achieved through the use of a one-piece fastener in the form of a nut which encircles the shaft element and effects forcible engagement between two telescopically-engaged collars, the outer collar (the "outer") having a taper on its inside surface, and the inner collar (the "inner") having a taper on its outside surface. The collars and the nuts are machined so as to provide an interlock between the components which enables the components to be preassembled and slid along the shaft element to the desired position without risk of loss of individual components of the mounting device.

It is significant in providing a mounting device of this character to enable facile release of the engagement between the inner and the outer to enable the machine element to be released from its anchored position for further adjustment or removal. In the devices illustrated in the Soussloff patents, the tightening of the device to anchor the element on the shaft element is accomplished by rotation of the nut in one direction and loosening of the device to release the element from its anchored position is accomplished by reverse rotation of the nut. The enablement of this facile release requires special machining operations which add to the expense of the device.

It has been found desirable to provide a less expensive mounting device which is possessed of many of the advantages of the prior art devices shown in the Soussloff patent

SUMMARY OF THE INVENTION

The present invention provides a novel universally adjustable device providing facile tightening and loosening of the device when mounted in situ between a machine element and its shaft element.

The present invention provides a simplified adjustable device comprising inner and outer telescopically-engaged sleeves with matching tapered surfaces confronting one another so that when the telescopically-engaged elements are inserted between the outside of a shaft element and the bore of a machine element, the inner and outer sleeves may be relatively displaced axially in one direction to interlock the outer sleeve with the bore of the machine element and/or lock the inner sleeve with the outside of the shaft element, and be relatively displaced in the opposite direction to release the interlock.

The novel device of the present invention includes standard threads on the inner and outer which cooperate with a threaded adjustor to achieve tightening and loosening.

BRIEF DESCRIPTION OF THE DRAWINGS

All of the objects of the present invention are more fully set forth hereinafter with reference to the accompanying drawings, wherein:

FIG. 1 is an exploded perspective view of a mounting device embodying the present invention with a portion of the "outer" broken away to show its cross section;

FIG. 2 is a perspective view of a one-piece adjusting nut for both tightening and loosening the device;

FIG. 3 is a perspective view of a two-piece adjusting nut, one piece for tightening the device and the second piece for loosening it;

DESCRIPTION OF THE PREFERRED EMBODIMENTS

Figure 4:
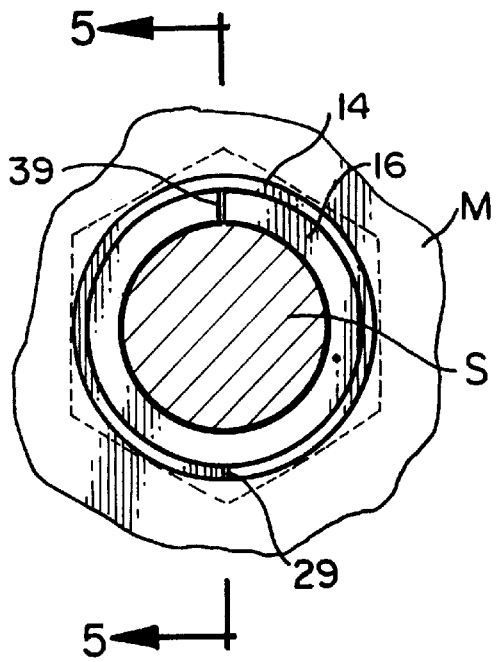
FIG. 4 is an left-hand end view of the device shown in FIG. 1, showing the one-piece adjusting nut in phantom lines.

The inner and outer of the first embodiment of the present invention are shown in FIG. 1 which is an exploded view showing the positioning of the components prior to assembly. In FIG. 1, the machine element M is provided with a bore B which, in the present instance, is a smooth cylindrical bore with a uniform diameter. However, it should be noted that the bore may have a uniformly tapered diameter. The shaft element S also has a cylindrical peripheral surface P of a uniform diameter. The mounting device comprises an outer sleeve (the outer) 14 which is adapted to telescopically receive an inner sleeve (the inner) 16. As shown in FIGS. 1 and 4–6, the outer 14 has a body portion with a uniform outer diameter to match the diameter of the bore B. In the present instance, the outer has a cylindrical outer surface 22 and a tapered inner surface 24. At the right-hand end of the outer 14, the sleeve has external threads 26 which terminate at the free end in an abutment surface 28. The outer 14 also has a longitudinal slit 29 extending throughout its length to afford expansion and contraction of the outer surface 22. The outer uniform surface 22 of the outer 14 engages the bore B of the machine element M.

Figure 5:
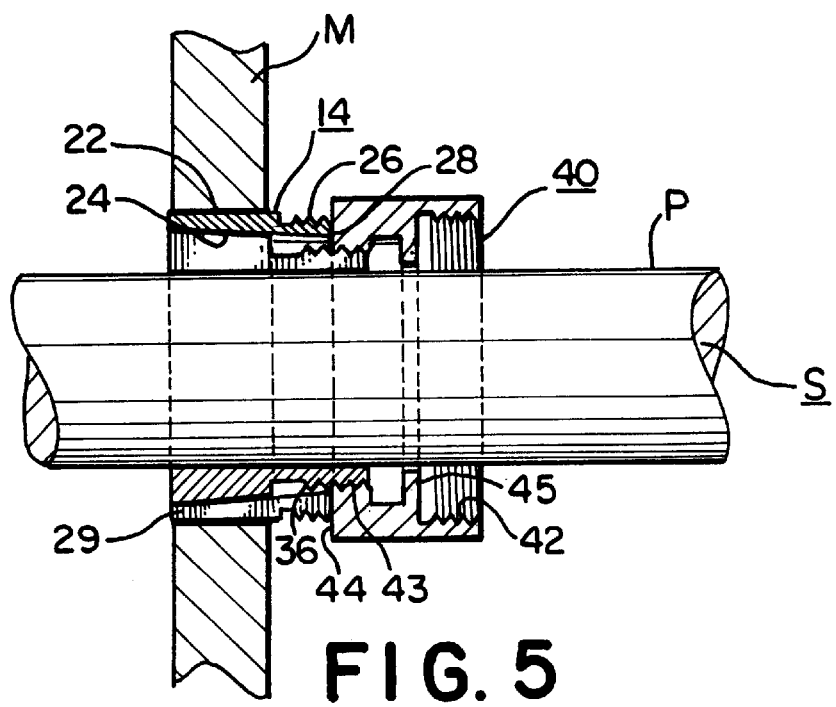
FIG. 5 is a sectional view taken on the line 5—5 of FIG. 4, showing the one-piece adjusting nut in section in the tightening orientation.

The inner 16 likewise has a body portion with a cylindrical inner surface 32 and a tapered outer surface 34. The inner surface 32 is adapted to mount on the peripheral surface P of the shaft element S, and the outer surface 34 is tapered to match the tapered surface 24 of the outer 14. At one end, the inner has external threads 36 which terminate at the free end in an annular abutment surface 38. The inner 16 is also provided with a slit 39 extending throughout its length so as to afford expansion and contraction of the inner surface 32. When assembled between the shaft S and the machine element M as shown in FIGS. 4 and 5, the relative axial displacement of the inner and outer in one direction will expand the surface 22 of the outer 14 and contract the surface 32 of the inner 16. Relative axial displacement in the opposite direction will allow the outer surface 22 to contract and the inner surface 32 to expand to release the interengagement between the shaft S and the machine element M.

Relative axial displacement of the inner and outer is achieved with an adjustor. In the embodiment shown in FIGS. 4–6, the adjustor is a one-piece nut 40 having internal threads 42 at the right-hand end in FIG. 5 which are dimensioned to threadedly engage the threads 26 of the outer. In addition, the nut 40 has internal threads 43 at the other end which threadedly engage the threads 36 of the inner (see FIG. 5). The other end of the one-piece adjustor 40 has a radial abutment surface 44 adjacent the threads 43 which is adapted to engage against the radial abutment surface 28 of the outer 14. Internally between the threads 42 and 43, an abutment surface 45 is positioned centrally of the adjustor 40. FIG. 5 illustrates the tightening position of the adjustor 40 which effects relative displacement of the inner 16 and outer 14 to tighten the inner and outer against the shaft element and the machine element, respectively. When the elements are interlocked by fully tightening the adjustor, the adjustor 40 may be unscrewed from the inner and removed from the shaft, although it may also be left in place.

Figure 6:
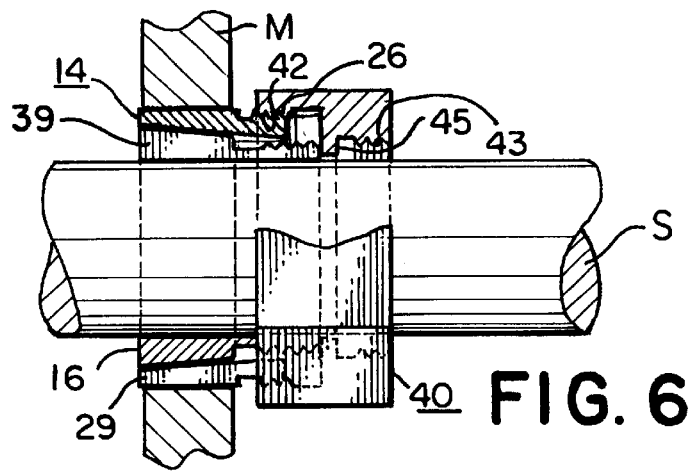
FIG. 6 is a sectional view similar to FIG. 5, showing the one-piece nut partially in section in the loosening orientation.

When it is desired to release the interlock between the machine element and the shaft, the one-piece nut 40 is disengaged from the threads 36 and is removed from the shaft. It is then reversed and replaced on the shaft so that the threads 42 engage the threads 26 of the outer 14 (see FIG. 6). When the nut 40 is tightened on the threads 26 of the outer, the abutment surface 45 engages against the abutment surface 38 of the inner 16, and tightening the nut 40 effects relative axial displacement of the inner and outer so as to achieve loosening and release of the interlock, as shown in FIG. 6.

To achieve the desired relative displacement of the inner 16 and outer 14, the radial annular end faces 28 and 38 are smooth to provide proper abutment surfaces to cooperate with the annular radial abutment surfaces 44 and 45. The annular abutment surface 44 has an inner diameter corresponding to the diameter of the threads 43 and an outer diameter greater than the radial end face 28 of the outer 14. The surface 45 has an outer diameter corresponding to the diameter of the threads 42 and an inner diameter greater than the diameter of the peripheral surface P of the shaft element S. The nut 40 has a polygonal exterior surface, in the present instance hexagonal, to enable the use of a wrench to tighten and loosen the device.

In installations where the shaft S does not have a free end which is readily accessible to permit the adjustor 40 to be removed from the shaft and reversed, it is desirable to provide a two-piece adjustor, as shown in FIG. 3. As shown in FIG. 3, the two-piece adjustor comprises a first piece in the form of a relatively thin component 50 and a second piece in the form of a thicker component 51. The thin piece 50 has internal threads 143 which are adapted to engage the threads 36 of the inner 16. Either end face 144 of the thin piece 50 is adapted to abut against the radial end face 28 of the outer 14 so as to effect tightening of the device. The second piece 51 of the adjustor is employed to loosen the device. As shown in FIG. 3, the loosening piece 51 has internal threads 142 and a radial abutment face 145 projecting inwardly from the threads 142. When it is desired to loosen the device, the second piece 51 of the adjusting nut is mounted on the shaft with the threads 142 confronting the device. The threads are then threaded onto the threads 26 of the outer until the abutment 145 engages the radial end face 38 of the inner. Tightening the second piece 51 on the threads effects relative axial displacement of the inner and outer to release the interlock. The annular abutment surfaces 144 and 145 are dimensioned similarly to the abutment surfaces 44 and 45 of the nut 40.

In order to enable the alternative use of the two pieces 50 and 51, one of the pieces, in the present instance the piece 51, has a cutout 148 which has a circumferential width greater than the diameter of the outer peripheral surface P of the shaft S. The cutout 148 extends throughout the length of the second piece 51 and through the threads 142 and the abutment 145. In operation, after the piece 50 of the adjusting nut is utilized to tighten the device between the shaft and the machine element, it is loosened and displaced away from the threads 36 of the inner 16. The second piece 51 of the nut is then inserted onto the shaft between the first piece 50 and the telescopically-engaged sleeves of the device with its threads 142 confronting the device. The threads 142 are then threaded on the threads 26 of the outer to cause the abutment surface 145 of the second piece 51 to engage against the end face 38 of the inner to effect relative axial displacement so as to loosen the device. After loosening the device, the second piece of the adjusting nut may be unthreaded from the outer and removed from the shaft by simple radial displacement of the second piece.

Figure 7:
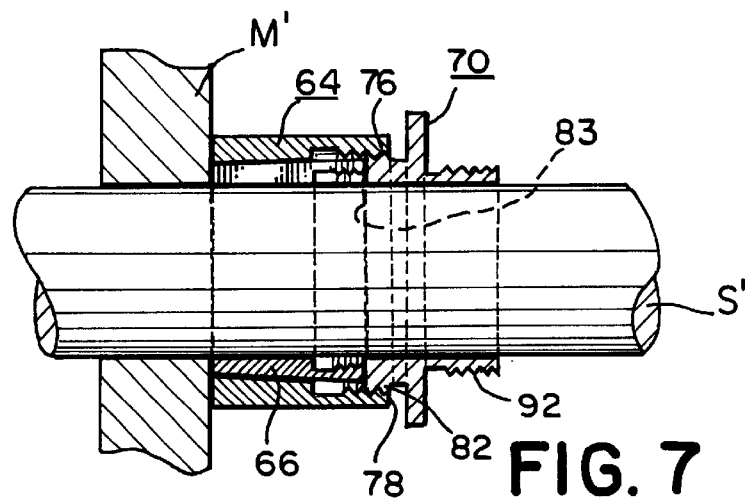
FIG. 7 is a sectional view similar to FIG. 5 illustrating a second embodiment of a mounting device embodying the present invention having internal threads on the "inner" and the "outer", which may be used as a locator or spacer for a machine element, a one-piece adjusting nut being oriented for tightening.
Figure 8:
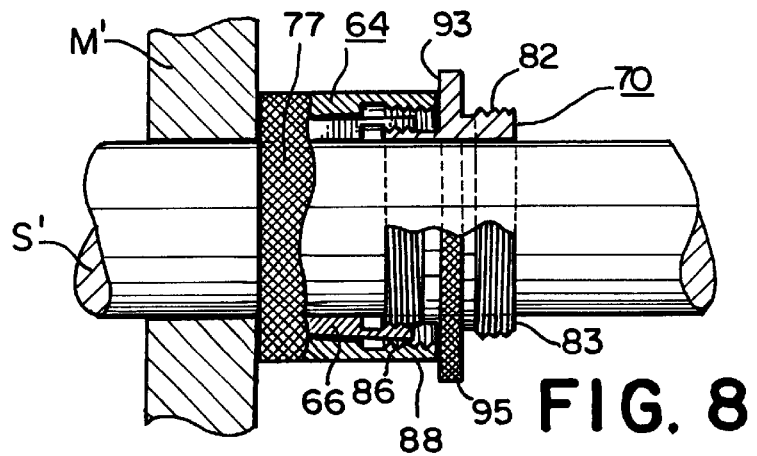
FIG. 8 is a view of the second embodiment, similar to FIG. 6 showing the knurling on the external surfaces of the "outer" and the adjusting nut.

FIGS. 7 and 8 illustrate a second embodiment of the invention which is designed for manual operation without tools. The device of FIGS. 7 and 8 is particularly adapted for providing a temporary positioning of a machine element M' on a shaft S'. In this embodiment of the invention, the positioning device has an outer sleeve 64 and an inner sleeve 66 and an adjustor 70. In the present instance, the outer 64 has internal threads 76 at one end and an abutment surface 78 at the free end of the threads 76. The inner 66 has internal threads 86 and an abutment surface 88 at the exposed end face of the inner 16. In the present instance, the inner 66 has a longitudinal slot throughout its length, whereas the outer 64 is continuous without a slot.

An adjustor 70 is provided to tighten and loosen the telescoping inner 66 and outer 64 on the shaft S'. The adjustor 70 has threads 82 at one end to engage the threads 76 of the outer 64 and the free end adjacent the threads 82 provides an abutment surface 83 for engaging the end face 88 of the inner 66 so as to tighten the device. The opposite end of the adjustor has external threads 92 for engaging the threads 86 of the inner. Between the threads 82 and 92 a radial wall provides an annular abutment surface 93 which bears against the end face 78 of the outer 64.

In the previously-described embodiments, the adjustors 40 and 50–51 have external surfaces in the form of a hex to facilitate the use of wrench for tightening and loosening the same, but in the present embodiment, the outer sleeve 64 has a knurled outer surface as indicated at 77 in FIG. 8, and the adjustor 70 has a knurled external surface as indicated at 95.

While particular embodiments of the invention has been herein illustrated and described, it is not intended to limit the invention to such disclosures, but changes and modifications may be made therein and thereto within the scope of the following claims.

What is claimed is:

1. A device for mounting or positioning a machine element having a bore upon a shaft element comprising a one-piece outer sleeve for engaging the machine element associated with said outer sleeve, having a uniform outside diameter and having a tapered internal surface, a one-piece inner sleeve having a uniform inside diameter for encircling the shaft element associated with said inner sleeve, and having a tapered external surface matching the tapered internal surface of said outer sleeve, and at least one axial slot extending longitudinally along at least a first of said inner and outer sleeves to permit adjustment of the uniform diameter of said first sleeve in one direction to effect interlocking of said first sleeve with its associated element and in the opposite direction to release said interlocking, each of said inner and outer sleeves having an annular radial end face and threads adjacent said end face, and an adjuster having first threads and a first annular radial abutment face adjacent said first threads, said adjuster first threads adapted to engage the threads of one of said inner and outer sleeves and said adjuster radial abutment face adapted to engage the radial end face of the other of said inner and outer sleeves, whereby tightening of said adjuster on said one sleeve effects relative axial displacement of said sleeves, the relative axial displacement of said matching tapered surfaces of said sleeves adjusting the uniform diameter of said first sleeve.

2. A device according to claim 1, wherein said first sleeve is said inner sleeve, said outer sleeve being continuous without an axial slot, tightening of said adjuster on said one sleeve effecting contraction of the uniform diameter of said inner sleeve to interlock the inner sleeve on said shaft element.

3. A device according to claim 1, wherein said adjuster has second threads and a second annular radial abutment face adjacent said second threads, said adjuster second threads adapted to engage the threads of said other of said inner and outer sleeves and said adjuster second radial abutment face adapted to engage the radial end face of said one of said inner and outer sleeves, whereby tightening of said adjuster on said other sleeve effects relative axial displacement of said sleeves, the relative axial displacement of said matching tapered surfaces of said sleeves adjusting the uniform diameter of said first sleeve.

4. A device according to claim 3, wherein said first sleeve is said inner sleeve, said outer sleeve being continuous without an axial slot, tightening of said adjuster on said other sleeve effecting expansion of the uniform diameter of said inner sleeve to release said inner sleeve from interlocking with said shaft element.

5. A device according to claim 3 wherein said adjuster is a one-piece nut, said first threads being at one axial end of said nut, said second threads being at the opposite axial end of said nut, said adjuster first radial abutment face being at the one axial end of said nut, and said adjuster second radial abutment face being positioned centrally of said nut between said first and second threads.

6. A device according to claim 3 wherein said adjuster is a two-piece nut, one piece of said two-piece nut having said first threads, the other piece of said two-piece nut having said second threads, said adjuster first radial abutment face being at one axial end of said one piece, said first annular radial abutment face having an inner diameter corresponding to the diameter of the first threads and an outer diameter greater than radial end face said other of said inner and outer sleeves, and said adjuster second radial abutment face being positioned internally of said second piece, said second annular radial abutment face having and inner diameter greater than the external diameter of the shaft element and an outer diameter corresponding to the diameter of said second threads.

7. A device according to claim 1 wherein said adjuster comprises a nut with threads at one axial end of said nut, said nut having a cutout extending throughout the length of said nut between its axial ends, said cutout passing through said first threads and said radial abutment face, said cutout having a circumferental width greater than the diameter of the shaft element, whereby upon disengagement of said threads from said one of the inner and outer sleeves, said nut may be removed from said shaft element, by outward radial displacement.

8. A device for mounting or positioning a machine element having a bore upon a shaft element comprising a one-piece outer sleeve having a uniform outside diameter for engaging the machine element and having a tapered internal surface, a one-piece inner sleeve having a uniform inside diameter for encircling the shaft element and having a tapered external surface matching the tapered internal surface of said outer sleeve, and at least one axial slot extending longitudinally along at least a first of said inner and outer sleeves to permit adjustment of the uniform diameter of said first sleeve in one direction to effect interlocking of said first sleeve with its associated element and in the opposite direction to release said interlocking, one of said inner and outer sleeves having an annular radial abutment face and threads adjacent said abutment face, the other of said inner and outer sleeves having an annular radial abutment face, and an adjuster having threads and an annular radial face adjacent said threads, said adjuster threads adapted to engage the threads of said one of said inner and outer sleeves and said adjuster annular radial face adapted to engage the radial abutment face of the other of said inner and outer sleeves, whereby tightening of said adjuster on said one sleeve effects relative axial displacement of said sleeves, the relative axial displacement of said matching tapered surfaces of said sleeves adjusting the uniform diameter of said first of said inner and outer sleeves.

\* \* \* \* \*